United States Patent

[11] 3,611,141

[72] Inventor Derek Brian Waters
Chelmsford, England

[21] Appl. No. 776,062
[22] Filed Nov. 15, 1968
[45] Patented Oct. 5, 1971
[73] Assignee International Standard Electric Corporation
New York, N.Y.
[32] Priority Dec. 20, 1967
[33] Great Britain
[31] 57,880/67

[54] DATA TRANSMISSION TERMINAL
9 Claims, 9 Drawing Figs.

[52] U.S. Cl. .......... 325/41, 325/38 A, 340/146.1, 340/347, 178/69
[51] Int. Cl. .......... H03k 3/24
[50] Field of Search .......... 178/68, 69; 325/384, 41, 42; 340/146.1, 347

[56] References Cited

UNITED STATES PATENTS

| | | | |
|---|---|---|---|
| 2,700,696 | 1/1955 | Barker | 340/347 |
| 3,154,777 | 10/1964 | Thomas | 340/347 |
| 3,521,274 | 7/1970 | Sawai | 325/38 |
| 3,369,229 | 2/1968 | Dorros | 325/38 |
| 3,405,235 | 10/1968 | Carter | 178/69 |

*Primary Examiner*—Robert L. Griffin
*Assistant Examiner*—Peter M. Pecori
*Attorneys*—C. Cornell Remsen, Jr., Walter J. Baum, Percy P. Lantzy, Philip M. Bolton, Isidore Togut and Charles L. Johnson, Jr.

ABSTRACT: In the transmitter, a code translator translates four digit binary code groups into three digit ternary code groups having either zero or positive disparity only and a lower digit rate thin the binary groups. The cumulative line disparity is monitored and if the positive disparity rises then certain of the ternary groups with positive disparity are complemented to reduce disparity. At the receiver zero disparity ternary groups and positive disparity ternary groups are translated directly to binary groups, while any negative disparity ternary group is independently translated into binary groups corresponding to the original positive disparity ternary group before it was complemented.

| | | | | | | | | |
|---|---|---|---|---|---|---|---|---|
| Binary | 0111 | 1010 | 0010 | 1110 | 1111 | 0100 | 0100 | 0100 |
| Ternary (before inversion) | − + + | + 0 − | − 0 + | + + − | + + + | 0 + + | 0 + + | 0 + + |
| Character Disparity | +1 | 0 | 0 | +1 | +3 | +2 | +2 | +2 |
| Ternary (after inversion) | − + + | + 0 − | − 0 + | − − + | + + + | 0 − − | 0 − − | 0 + + |
| Accumulated Disparity to Line | +1 | +1 | +1 | 0 | +3 | +1 | −1 | +1 |

Fig. 1.

Inventor
DEREK B. WATERS
By Alfred C. Hill
Agent

Inventor
DEREK B. WATERS
By Alfred C. Hill
Agent

Inventor
DEREK B. WATERS
By Alfred C. Hill
Agent

Inventor
DEREK B. WATERS
By Alfred C. Hill
Agent

Inventor
DEREK B. WATERS
By Alfred C. Hill
Agent

Inventor
DEREK B. WATERS
By Alfred C. Hill
Agent

Inventor
DEREK B. WATERS
By Alfred C. Hill
Agent

Inventor
DEREK B. WATERS
By Alfred C. Hill
Agent

Inventor
DEREK B. WATERS
By Alfred C. Hill
Agent

DATA TRANSMISSION TERMINAL

BACKGROUND OF THE INVENTION

This invention relates to terminals for data transmission systems, such as PCM (pulse code modulation) systems.

Data systems commonly utilize streams of binary digits but under certain circumstances this presents difficulties. For example in the case of television signals transmitted by PCM techniques very high digit rates are encountered when binary digits are used. One method of reducing the digit rate, at least as far as the transmission medium is concerned, is to convert the binary signals into ternary signals. However, one of the problems associated with high-speed date transmission is the maintenance of a low disparity in the transmitted signal.

In some existing schemes for converting binary pulse trains into ternary, i.e., for PCM transmission, namely, Alternate Mark Inversion the resultant ternary train has the same digit rate as the original binary train. Thus, the noise and cross-talk margin is reduced compared with binary transmission, while no advantage is taken of the greater information capacity of the ternary to reduce the digit rate.

SUMMARY OF THE INVENTION

An object of the present invention is to provide in a terminal of a data transmission system a code translator which converts the binary pulse stream into a ternary pulse stream having a lower digit rate, while maintaining low disparity and adequate timing content for generation. This provides either increased route capacity, or an improvement in cross-talk margins for the same capacity.

A feature to the present invention is the provision of a terminal, for a data transmission system, comprising a transmitter and a receiver; the transmitter including first means for converting groups of binary digit signals into ternary digit signal groups each having either zero disparity or a disparity of one polarity only, second means coupled to the first means for inverting selected ternary groups having disparity of the one polarity into ternary groups having disparity of a polarity opposite the one polarity, third means coupled to the second means for determining the cumulative disparity of the ternary signal output of the second means and to control said inverting of said selected ternary groups in the second means in response to an increase of the cumulative disparity so as to reduce the cumulative disparity of the ternary signal output of said second means; and the receiver including fourth means coupled to the third means for converting zero and said one polarity disparity ternary groups into groups of binary digits and for converting ternary groups with disparity of the opposite polarity into binary groups corresponding to ternary groups of the one polarity disparity which are the inverse of the ternary groups having disparity of said opposite polarity.

In a preferred embodiment, the transmitter and receiver include frequency changing means whereby the digit rate of the ternary signals is times the digit rate of the binary signals, where $n_1$ is the number of ternary digits in each ternary group and $n_2$ is the number of binary digits in each corresponding binary groups.

Now consider the 27 ternary characters consisting of three digits. If the character 000 is rejected, there is left six characters of zero disparity 10 characters of positive disparity and ten characters of negative disparity which are the inverse of the positive disparity characters.

If there are sixteen, four-digit binary combinations, six of these can be represented by the six zero disparity, three-digit ternary characters. The remaining 10 binary characters can each be represented by a positive disparity ternary character and its inverse, the choice between these being made so as to keep the accumulated disparity to a minimum.

Thus, the digit rate of the ternary signals is three-fourths that of the binary signals. A 25 mc./s. binary signal is converted in a low disparity ternary signal of 18–75 mc./s.

In the transmitter, the 16 four-digit binary characters are translated into three-digit ternary characters of zero or positive disparity. A count is kept of the accumulated disparity of the line signal. If this count is negative, the nonzero disparity characters are transmitted erect, or without inversion, and if the count is positive they are inverted. Thus, the accumulated disparity is kept to a minimum. The zero-disparity characters do not affect the accumulated disparity and are, therefore, not controlled by it.

A ternary digit train assembled in this manner has a maximum accumulated disparity of four, the maximum at the end of a three-digit character is three. The longest possible block of positive or negative marks without transition is six and the longest possible block of zeros is four. This means that DC balance is obtained together with adequate timing constant for regeneration.

TABLE 1

| Decimal Number | Binary | | | | Ternary | | | | | | |
|---|---|---|---|---|---|---|---|---|---|---|---|
| | | | | | As translated from binary | | | Dis-parity | After inversion | | |
| | 1 | 2 | 3 | 4 | $1_T$ | $2_T$ | $3_T$ | | $1_T$ | $2_T$ | $3_T$ |
| 7 | 0 | 1 | 1 | 1 | − | + | + | 1 | + | − | − |
| 6 | 0 | 1 | 1 | 0 | 0 | 0 | + | 1 | 0 | 0 | − |
| 5 | 0 | 1 | 0 | 1 | 0 | + | 0 | 1 | 0 | − | 0 |
| 4 | 0 | 1 | 0 | 0 | 0 | + | + | 2 | 0 | − | − |
| 3 | 0 | 0 | 1 | 1 | + | − | + | 1 | − | + | − |
| 2 | 0 | 0 | 1 | 0 | − | 0 | + | 0 | | | |
| 1 | 0 | 0 | 0 | 1 | − | + | 0 | 0 | | | |
| 0 | 0 | 0 | 0 | 0 | 0 | − | + | 0 | | | |
| 8 | 1 | 0 | 0 | 0 | 0 | + | − | 0 | | | |
| 9 | 1 | 0 | 0 | 1 | + | − | 0 | 0 | | | |
| 10 | 1 | 0 | 1 | 0 | + | 0 | − | 0 | | | |
| 11 | 1 | 0 | 1 | 1 | + | 0 | 0 | 1 | − | 0 | 0 |
| 12 | 1 | 1 | 0 | 0 | + | 0 | + | 2 | − | 0 | − |
| 13 | 1 | 1 | 0 | 1 | + | + | 0 | 2 | − | − | 0 |
| 14 | 1 | 1 | 1 | 0 | + | + | − | 1 | − | − | + |
| 15 | 1 | 1 | 1 | 1 | + | + | + | 3 | − | − | − |

There are 16 ways of allocating the 16 binary characters to the 16 ternary representations. The codes shown in table 1 enable some economy to be made in translating to zero-disparity codes. Apart from this, no attempt was made to find a table which used the least number of gates.

It will be seen that six binary codes can be translated into six ternary codes which have zero disparity.

The other binary characters are translated to ternary characters with positive disparity. The inverter is controlled by the accumulated disparity and the translated characters are inverted as necessary to correct the disparity. FiG. 1 shows the translation of a typical binary input.

At the receiver the ternary characters are translated to binary independently. Thus, if the accumulated disparity count in the transmitter causes wrong inversions no digital errors are introduced. Digital errors on the line only affect the actual characters mutilated, since there is no disparity count or inverter in the receiver to be upset.

BRIEF DESCRIPTION OF THE DRAWINGS

The above-mentioned and other features and objects of this invention will become more apparent by reference to the following description taken in conjunction with the accompanying drawings, in which:

FIG. 1 is a table illustrating the translation of a typical binary signal;

DESCRIPTION OF THE PREFERRED EMBODIMENTS

Figure 2:
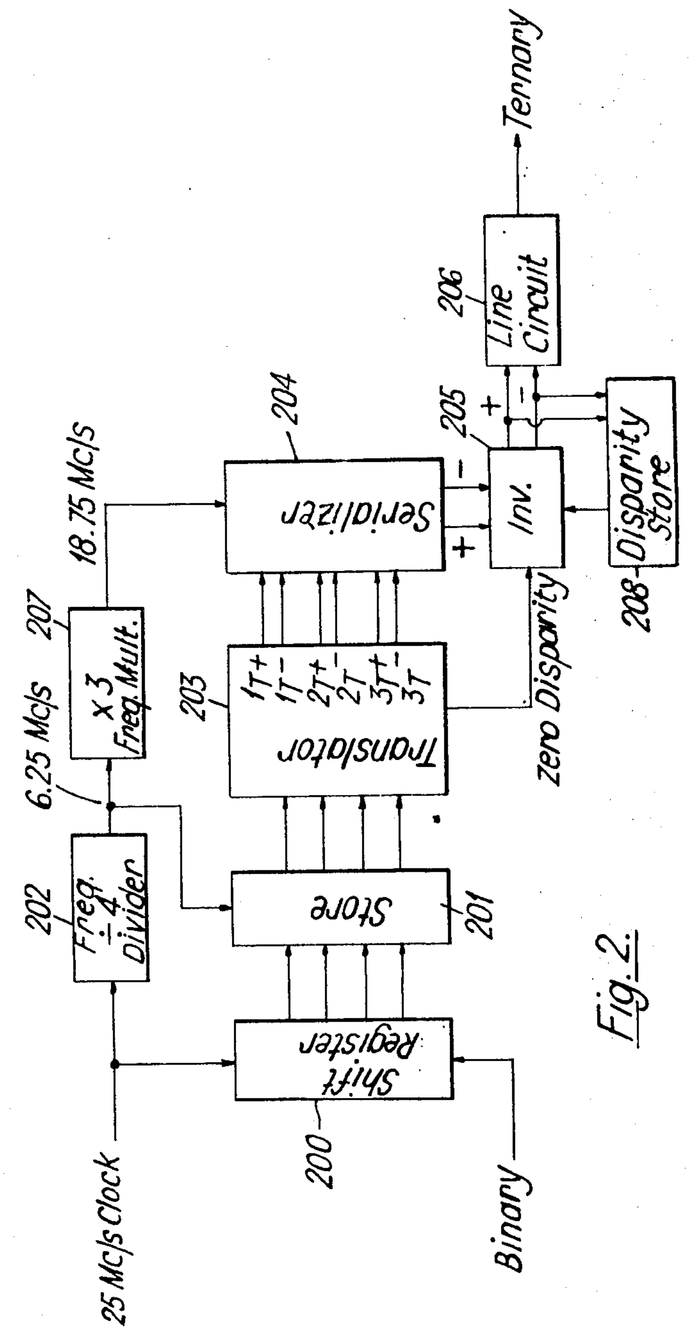
FIG. 2 is a block diagram of those portions of a transmitter essential for the understanding of the invention.

In the transmitter arrangement illustrated in FIG. 2 the four binary digits making up one character are received in serial form by shift register 200, from where they are transferred in parallel to store 201. The binary input is assumed to be the rate of 25 mc./sec. and a local 25 mc./sec. clock is used to control shift register 200. The clock rate is divided by four in divider 202 to give a 6.25 mc./sec. clock, equivalent to the character rate. The 6.25 mc./sec. clock controls store 201. The stored characters are then applied to translator 203 where they are translated from binary to ternary characters having zero or positive disparity in accordance with the first two columns of table 1. The ternary characters are then serialized by a three-digit distributor or serializer 204. The clock for the serializer 204 is 18.75 mc./sec. obtained by applying the 6.25 mc./sec. clock to a three times multiplier 207. The output of the serializer is transformed to inverter 205 on two paths, one for positive marks and one for negative marks. The inverter will pass the ternary digits to line circuit 206 where they are returned and combined for line transmission. The inverter is inhibited whenever a ternary character with zero disparity is generated, this by a line from translator 203, where the zero disparity characters are identified by gating. For nonzero disparity characters inverter 205 is controlled by the accumulated line disparity which is determined by feeding the inverter output to disparity store 208.

Figure 3:
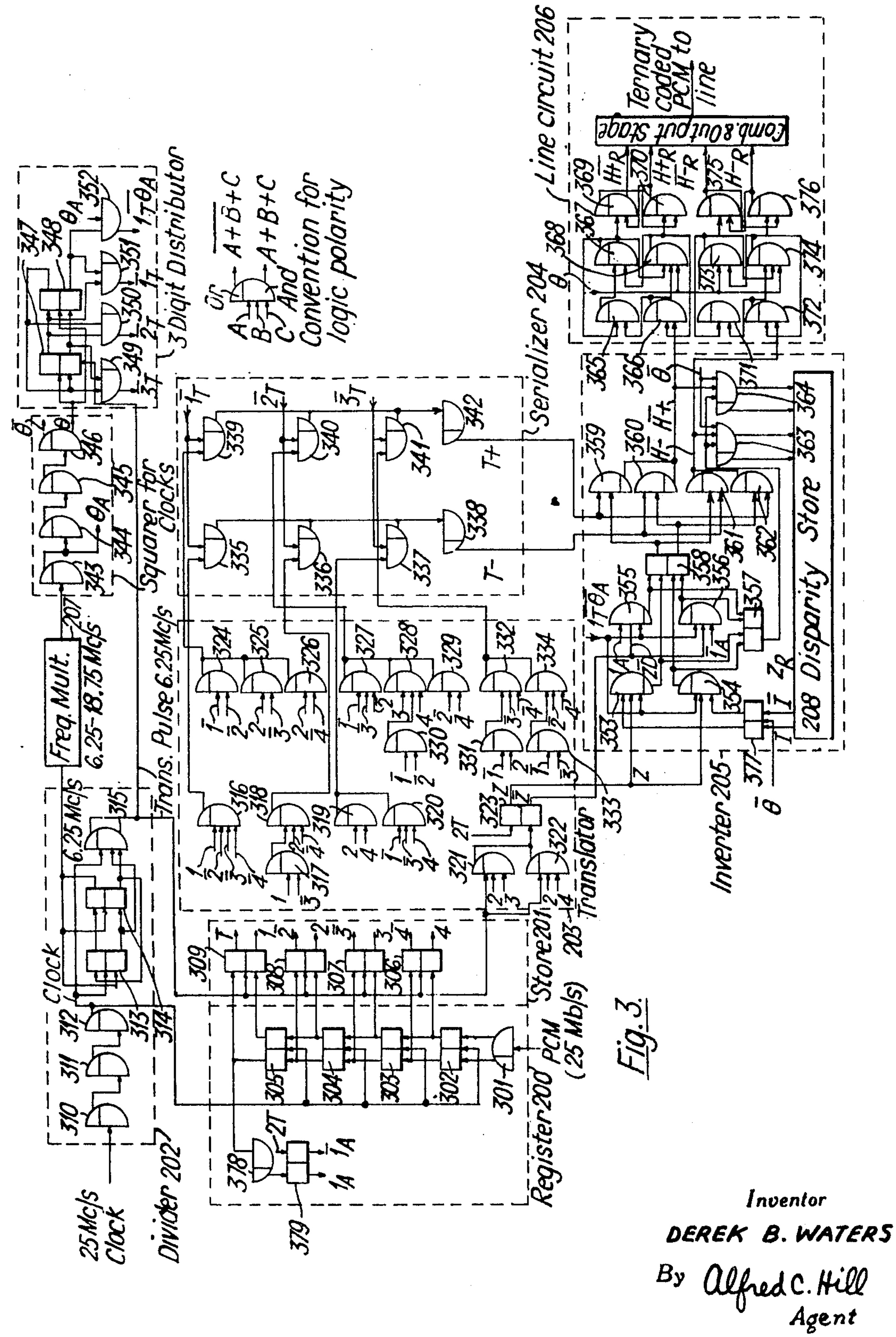
FIG. 3 is a schematic logic diagram of the block diagram of FIG. 2.

Referring now to the more detailed logic arrangements to be found in the transmitter, the various blocks of FIG. 2 are generally found in FIG. 3 indicated by dotted lines. The timing waveforms of FIG. 4 refer to FIG. 3.

Binary PCM is received from the PCM terminal and clocked into the four-stage shift register (302–305) via gate 301. One a four-digit character has been assembled it is transferred into the parallel store (306–309) where it is held for four-digit periods.

A 25 mc./sec. clock is received from the transmit PCM terminal. This is squared and drives, via gates 310, 311, 312, the input shift registers and the divider by 4 (313, 314, 315). This provides a transfer pulse every fourth clock period and a 6.25 mc./sec. square wave to the frequency multiplier 207.

The character is translated by the gates (316–320) and (324–334) as described above. the outputs are read out sequentially, by the outputs $1_T$, $1_T$, $3_T$ from the three-digit distributor, in the gates (335–337) and (339–341). The outputs from these are "or" connected and inverted by gates (338; 342) to give the outputs T− T+, these correspond to the ternary of Table 1 T− is positive for negative digits, and T+ positive for positive digits.

A tuned amplifier in the multiplier 27 gives an 18.75mc./sec. sine wave to a squaring stage consisting of gates 343–346 to provide the 18.75mc./sec. ternary clock "θ" from buffer (gate 346). This drives the ternary digit distributor (flip-flops 347,348 and gates 349, 350, 351). $\bar{\theta}$ is a clock advanced by three propagation delays relative to θ. This is AND-gated with $\overline{1_T}$ (352) to provide a pulse $\overline{1^T\theta_A}$ to set up the inverter. The transfer pulse is applied to the reset of flip-flop 347 to synchronize the ternary and binary dividers.

The inverter is controlled by I (the output from disparity counter 208) or digit 1 from flip-flop 309 according to whether the ternary character is zero disparity or not. So that the inverter can be set up by the time digit $1_T$ occurs on lines T+ and T−, digit 1 is picked off flip-flop 309 and input shift register by gate 378 and held on flip-flop 379 until it has been used. The zero-disparity condition Z is similarly set up and held on flip-flop 323. The flip-flops 323 and 379 are reset by $2_T$. For zero disparity characters, $\bar{Z}$ is negative, which enables $1_A\overline{1_T\theta}$to set up the flip-flop 358 through gates 355 and 356 and Z is positive which shuts off the I, $\bar{I}$ input to gates 353 and 354. When the flip-flop 358 is in one state, gates 359 and 361 connect T− to $\overline{H-}$ and T+ to $\overline{H+}$. When flip-flop is in the other state gates 360 and 362 connect T− to $\overline{H-}$ and T+ to $\overline{H-}$, thus, inverting the ternary character represented by T+ and T−. The control signal from the analog disparity store 208 I, $\bar{I}$ is retimed in flip-flop 377, to prevent it changing during $\overline{1_T\theta_A}$. For nonzero disparity characters, Z is negative and I, $\bar{I}$ controls the inverter.

$\overline{H+}$ and $\overline{H-}$ present the final ternary output. This is standardized for width by gating with $\bar{\theta}$ in gates (363, 364) to give half width pulses (full width pulses cannot be used since part of ternary digit $1_T$ time slot is lost in translating and setting up the inverter). These pulses drive the analogue disparity store 208 including a capacitor (not shown) which is charged in one direction during positive ternary digits and the other during negative digits. The voltage on this capacitor is applied to a slicer, the output from this is I and $\bar{I}$, I being positive when the accumulated disparity is negative.

The disparity store is not very precise due to irregularities in clock periods and to component tolerances. When nonzero disparity characters are transmitted this results in occasional incorrect inversions which do not cause digital errors. When mainly zero disparity characters are transmitted these errors can cause the capacitor to be charged to one extreme, saturating transistors and causing the next few nonzero disparity characters to be incorrectly inverted. To avoid this the input to the disparity store is blanked off during zero disparity characters so that the capacitor discharges to the zero accumulated disparity state. This is achieved by applying $Z_R$ to gates 363, 364. This is the zero disparity condition retimed by $\overline{1_T\theta_A}$ in flip-flop 357.

$\overline{H+}$ and $\overline{H-}$ are retimed by θ in gates 365–370 and 371–376. This circuit retimes on the clock transition so that differentiated clock pulses are not required.

The retimed outputs $H+_R$, $\overline{H+_R}$, $H-_R$, $\overline{H-_R}$ are applied to two long-tailed pairs with push-pull transformer windings (not shown). These cooperate to produce ternary in the output winding.

Figure 5:
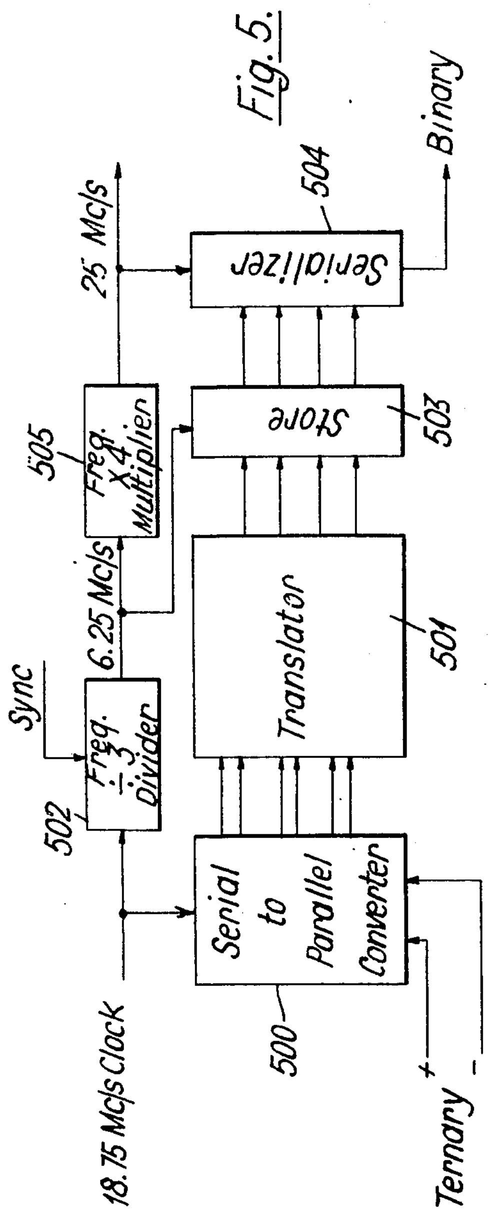
FIG. 5 is a block diagram of portions of a receiver.

In the receiver shown in FIG. 5, the incoming ternary positive and negative marks are stored on separate shift registers and converted from serial and parallel from in converter 500. This operates under the control of an 18.75 mc./sec. clock and transfers the parallel ternary code to an array of gates in translator 501. Here all zero disparity codes are converted to their binary equivalent, as are also the positive disparity codes. All negative disparity codes received will be, in fact, original positive disparity codes which were inverted at the transmitter and so they are converted directly into the appropriate binary codes corresponding to the original positive disparity codes.

The 18.75 mc./sec. clock is meanwhile divided by three in frequency multiplier 502 and a 6.25 mc./sec. output is derived with a phase determined by synchronizing signals obtained from the line input as follows.

If the ternary character 000 occurs an "all" pulse is generated. This is stretched so that the mark to space ratio will be unity when the average rate is one per thousand words. This is applied to an integrator driving a slicer. Thus, the DC level out of the integrator depends on the rate of occurrence of "all zero" characters, and when this exceeds one in 1,000 the slicer turns over causing a ternary clock-blanking pulse to be generated, this is repeated until synchronism is achieved.

The binary output of translator 501 is transferred to parallel store 503 and from there, with a 6.25 mc./sec. clock, the characters are transferred to a parallel to serial converter 504. The 6.25 mc./sec. clock is multiplied by four in frequency multiplier 505 to provide a 25 mc./sec. binary clock and this is used to transfer the binary digits serially to the output.

Figure 6:
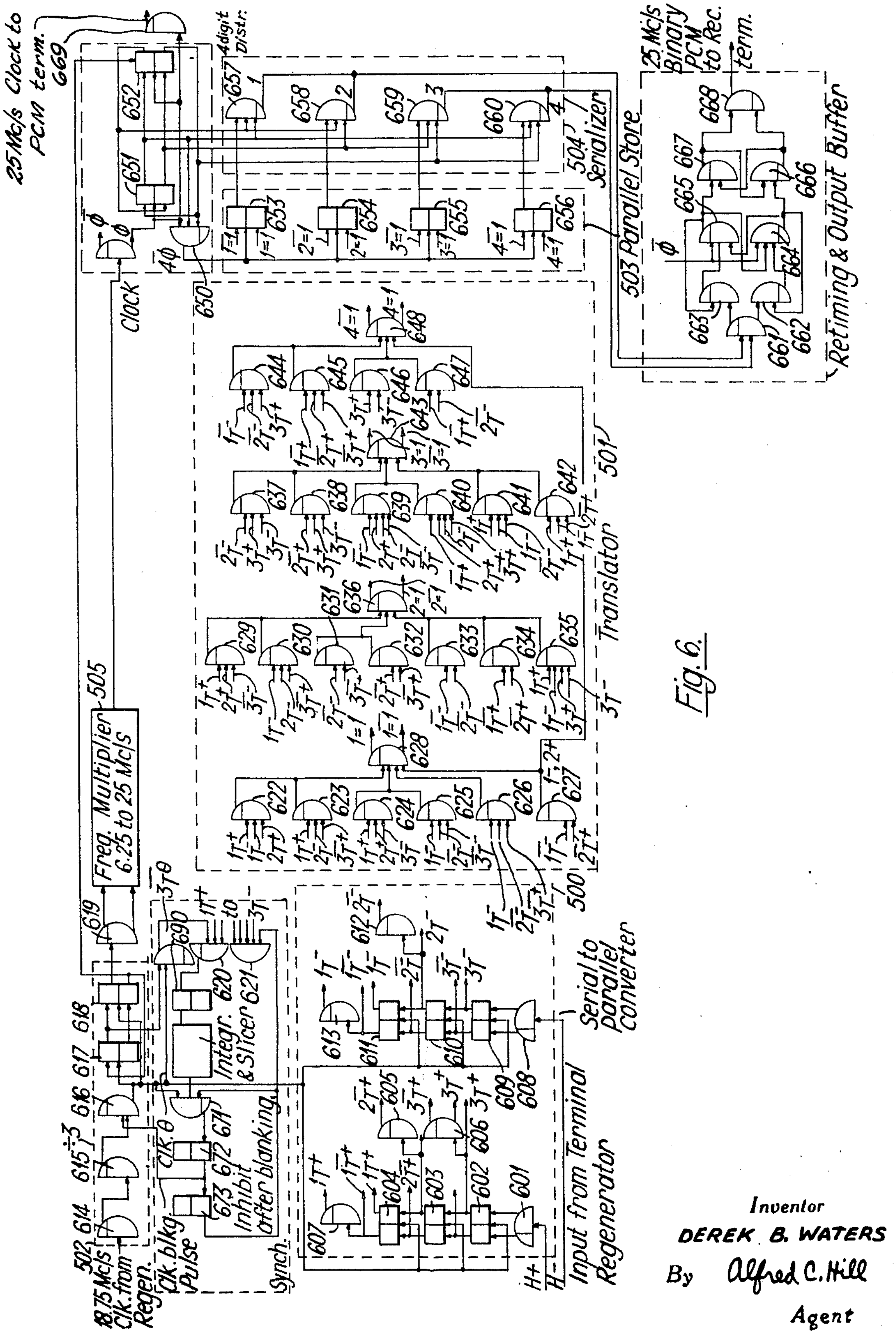
FIG. 6 is a schematic logic diagram of the block diagram of FIG. 5.

The detailed logic of the receiver is illustrated in FIG. 6.

Two binary streams corresponding to H+ and H− in the transmit translator are received from the terminal regenerator. These are fed into two three-stage shift registers (flip-flops 602, 603, 604 and 609, 610, 611) via gates 601, 608. Extra gates 605, 606, 607, 612, 613 on the shift registers keep the fanout within acceptable limits.

An 18.75 mc./sec. clock is received from the terminal regenerator. This is squared and buffered by gates 614, 615, 616. The output from gate 616 drives the divider by 3 (flip-flops 617, 618) and the input shift registers. The divide by 3 output drives the frequency multiplier via gate 619 and provides a locking pulse to synchronize the ternary and binary dividers.

In the frequency multiplier, the divided by three waveform is fed to a tuned amplifier which selects the 6.12 mc./sec. fundamental. This is full wave rectified to produce even harmonics, the fourth, 25 mc./sec. harmonic is picked out in a second tuned-amplifier and provides the 25 mc./sec. clock Φ for the four-digit distributor (flip-flops 651, 652) and for the PCM receive terminal.

The ternary character which is translated is that which is in the two input shift registers when the inspection pulse $\overline{3_T\theta}$ occurs. If this character is 000 then and eight-input gate 620/621 gives an output pulse during $\overline{3_T\theta}$. This output is stretched to 80 μsec. in monostable 670. The output waveform of this will be 1:1 mark to space when the average occurrence of 000 characters is one in 1,000. When this rate is exceeded, the DC level from the integrator turns over the slicer and gives a negative input to gate 670. When the clock input to gate 671 from 616 is next negative the output from 671 triggers the monostable 672 which generates a 60 nsec. clock-blanking pulse, which makes the translator slip one digit relative to the incoming ternary code. This clock-blanking pulse also triggers the monostable 673 which generates a 100 μsec. inhibit pulse inhibiting the outputs of 671 and 670. This is necessary to enable the integrator capacitor to discharge partially, otherwise, several clock-blanking pulses may be generated in quick succession and the correct sync condition passed over.

The shift registers provide a parallel input to the translating array of gates 622–648. The outputs from this array, which change every ternary clock period, are correct once every three ternary or four binary clock periods. A transfer pulse $\overline{4}$ $\overline{\Phi}$ from the four-digit distributor, gates 650, 651, 652, transfers the output from the array into the parallel store (flip-flops 653–656) where it is held for four binary clock periods. The binary digits are read out serially. They are then retimed on $\overline{\Phi}$ in a retiming circuit (gates 661–668) similar to that in the transmitter.

Figure 4:
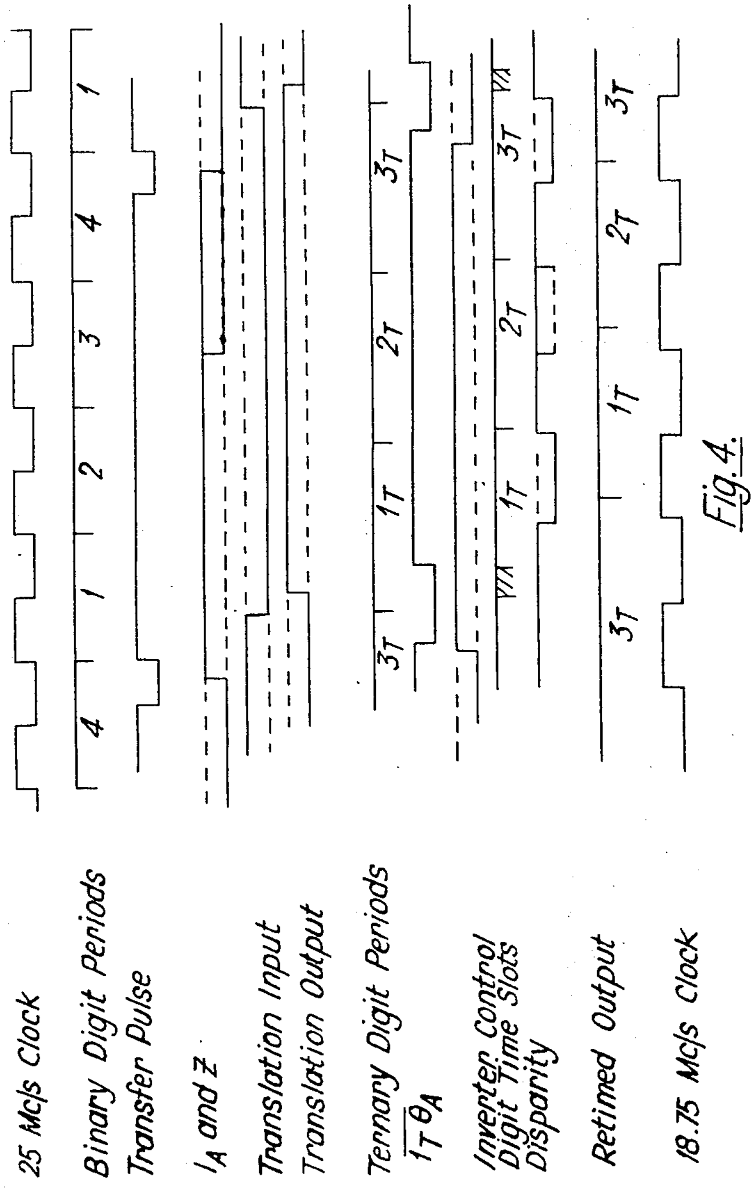
FIG. 4 is a timing diagram illustrating some of the waveforms used in FIG. 3.

It can be seen from Fig. 4 that part of digit $1_T$ time slot has to be used for setting up the inverter. So that information is available to set up the inverter, flip-flops 379 and 323 are required to hold $1_A$ and Z obtained from the input shift register. In addition, because digit $1_T$ is not full width at $\overline{H+}$, $\overline{H-}$, only half width pulses can be used for the input to the disparity store, and the output I from this is required for setting up the inverter while digit $3_T$ of the previous word is still being put in.

Figure 7:
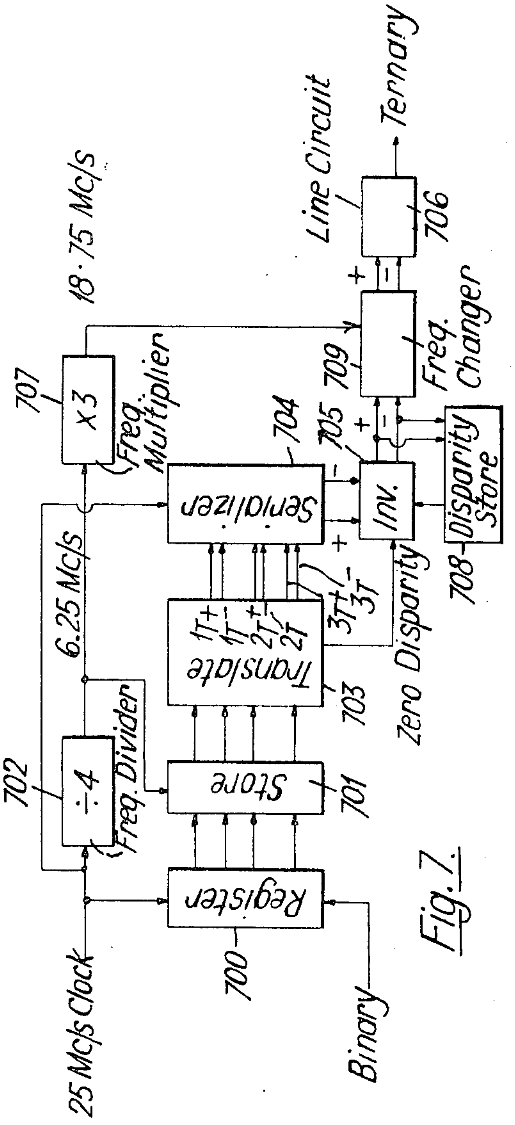
FIG. 7 is a block diagram of portion of a modified transmitter.
Figure 8:
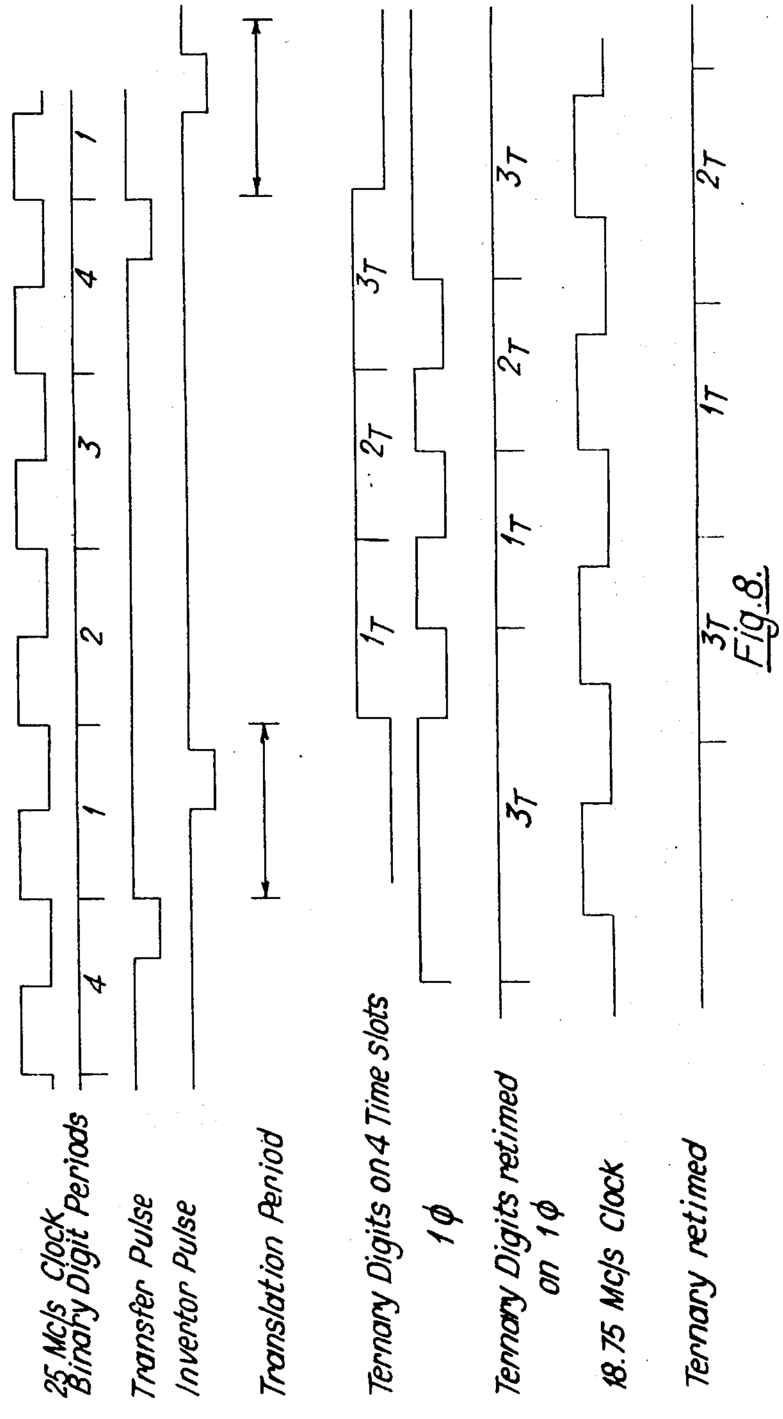
FIG. 8 is a timing diagram illustrating some of the waveforms used in FIG. 7.

All this can be avoided by controlling the parallel to serial conversion, and the inverter, by the 25 mc./sec. divide by four used as a digit distributor, instead of from the 18.75 mc./sec. three-digit distributor, as shown in FIG. 7. A A timing diagram for this arrangement is shown in Fig. 8.

The shift register 700, parallel store 701, clock divider 702 and translator 703 are the same as those used in Fig. 2. The serializer 704, however, operates with a 25 mc./sec. clock, thus allowing the translator 703 and inverter 705 a spare digit period. The output of the inverter is then fed to a frequency changer 709 where the ternary digits are retimed under the control of the 18.75 mc./sec. clock from the multiplier 707 before going to the line circuit 706. The disparity store 708 is similar to that of Fig. 2.

The three ternary digits are thus carried in four time slots, one being spare. This spare time slot allows 40 nsec. for translation and setting up the inverter. The inputs to the disparity store are 40 sec. wide and the output is not inspected until 10–15 sec. after the end of the previous word.

After the inverter, the ternary streams $\overline{H+}$ and $\overline{H-}$ would be retimed onto the 18.75 mc./sec. clock to drive the output stage.

The use of a translator of the type described for 1,536 Kbit/sec. 24 channel routes would make the line digit rate 1,152 kc./sec., which would give an improvement of 5–6 db. in near end crosstalk margin on 20-pound-cable. This would enable more cable pairs to be used for PCM.

Figure 9:
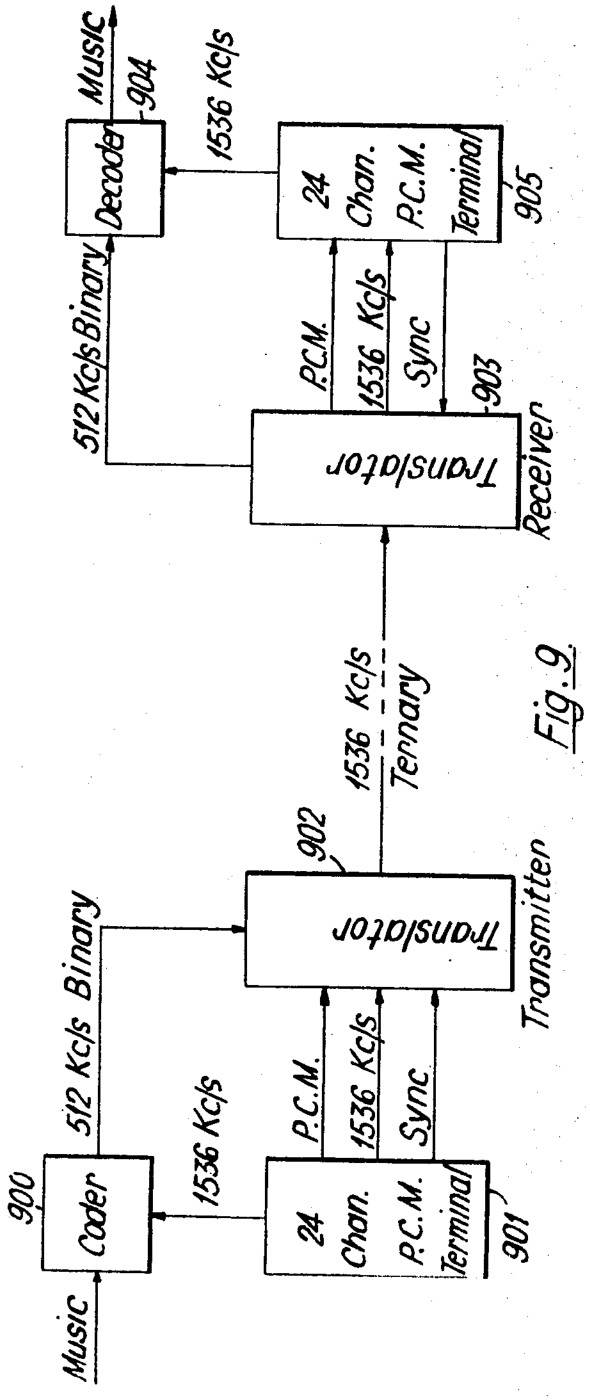
FIG. 9 is a block diagram of a transmission system showing one application of one form of the invention.

Alternatively the capacity of an existing 1536 kc./sec. route could be increased by 512 Kbit/sec. i.e., 32-channel capacity instead of 24. Since 24-channel groups are well established, it is unlikely that 32-channel groups would be used, but the extra 512 Kbit/sec. would enable a music program channel or high-speed data to be carried in addition to 24 speech channels. A translator designed for this purpose would not require frequency changing or dividers by four because the line digit rate is the same as the 24-channel PCM terminal rate. This would reduce the cost of the translator. Fig. 9 is a block diagram of how this would be implemented.

The program channel is first coded into binary by coder 900, delivering 512 Kbit/sec. The coder is operated under the control of a 1.536 kc./sec. clock derived from the 24-channel PCM terminal 901. Translator 902 receives the 24-channel binary-coded PCM and the binary-coded program channel, together with a 1,536 kc./sec. clock and synchronizing signals. The translator output to line is ternary coded, low-disparity signals at 1.535 Kbit/sec. and the receiver is the converse of the transmitter. The 512 Kbit/sec. binary is extracted from the output of translator 903 and decoded into its original form by decoder 904 while the 24-channel binary PCM is passed by PCM terminal 905, together with the 1,536 kc./sec. clock. The PCM terminal extracts the synchronizing signal and feeds this back to the translator. This enables synchronization at both ends to be achieved without increasing the overall synchronization time, which would be the case if the synchronizing were done at the translator stages.

While I have described above the principles of my invention in connection with specific apparatus, it is to be clearly understood that this description is made only by way of example and not as a limitation to the scope of my invention as set forth in the objects thereof and in the accompanying claims.

I claim:

1. A terminal, for a data-transmission system, comprising:
   a transmitter; and
   a receiver;
   said transmitter including
      first means for converting groups of binary digit signals into ternary digit signal groups each having either zero disparity or a disparity of one polarity only,
      second means coupled to said first means for inverting selected ternary groups having disparity of said one polarity into ternary groups having disparity of a polarity opposite said one polarity, and
      third means coupled to said second means for determining the cumulative disparity of said ternary signal output of said second means and to control said inverting of said selected ternary groups in said second means in response to an increase of the cumulative disparity so as to reduce the cumulative disparity of said ternary signal output of said second means; and
   said receiver including
      fourth means coupled to said third means for converting zero and said one polarity disparity ternary groups into groups of binary digits and for converting ternary groups with disparity of said opposite polarity into binary groups corresponding to ternary groups of said one polarity disparity which are the inverse of the ternary groups having disparity of said opposite polarity.

2. A terminal according to claim 1, wherein
   said transmitter further includes
      a first frequency changing means coupled to said first and second means; and
   said receiver further includes
      a second frequency changing means coupled to said fourth means; each of said first and second frequency changing means establishing the digit rate for said ternary signals equal to $n_1/n_2$ times the digit rate of the binary signals, where $n_1$ equals the number of ternary digits in each ternary group and $n_2$ equals the number of binary digits in each corresponding binary group.

3. A terminal according to claim 2, wherein said first means includes a shift register into which the incoming groups of binary digit signals are inserted in serial form, a first store coupled to said shift register in which groups of binary digits are transferred from said register for parallel storage, a translator coupled to said first store in which the parallel stored binary groups are translated into groups of ternary digits in parallel form, and fifth means coupled to said translator to convert said parallel ternary digits into serial form.

4. A terminal according to claim 3, wherein said first frequency changing means includes a source of a primary clock pulse train having the same digit frequency as said incoming binary digits, and sixth means coupled to said source to generate a secondary clock pulse train having a digit frequency equal to the digit frequency of the outgoing ternary digits;

the transfer of the binary digits from said store to said translator being under control of said primary clock pulse train, and the transfer of the ternary digits from said fifth means being under control of said secondary clock pulse train.

5. A terminal according to claim 3, wherein said first frequency changing means includes a source of a primary clock pulse train having the same digit frequency as said incoming binary digits, and sixth means coupled to said source to generate a secondary clock pulse train having a digit frequency equal to the digit frequency of the outgoing ternary digits;

the transfer of the binary digits from said store to said translator being under control of said secondary clock pulse train, and the transfer of the ternary digits foam said fifth means to said second means being under control of said secondary clock pulse train.

6. A terminal according to claim 1, wherein said first means includes a shift register into which the incoming groups of binary digit signals are inserted in serial form, a first store coupled to said shift register in which groups of binary digits are transferred from said register for parallel storage, a translator coupled to said first store in which the parallel stored binary groups are translated into groups of ternary digits in parallel form, and fifth means coupled to said translator to convert said parallel ternary digits into serial form.

7. A terminal according to claim 6, further including a source of a primary clock pulse train having the same digit frequency as said incoming binary digits, and sixth means coupled to said source to generate a secondary clock pulse train having a digit frequency equal to the digit frequency of the outgoing ternary digits;

the transfer of the binary digits from said store to said translator being under control of said primary clock pulse train, and the transfer of the ternary digits from said fifth means being under control of said secondary clock pulse train.

8. A terminal according to claim 6, further including a source of a primary clock pulse train having the same digit frequency as said incoming binary digits, and sixth means coupled to said source to generate a secondary clock pulse train having a digit frequency equal to the digit frequency equal to the digit frequency of the outgoing ternary digits;

the transfer of the binary digits from said store to said translator being under control of said primary clock pulse train, and the transfer of the ternary digits from said fifth means to said second means being under control of said secondary clock pulse train.

9. A terminal according to claim 1, wherein said fourth means includes a serial to parallel converter to convert the serial groups of ternary digits to parallel groups of ternary digits, a translator coupled to said converter to convert the parallel groups of ternary digits into parallel groups of binary digits, and fifth means coupled to said translator to convert said parallel groups of binary digits into serial groups of binary digits.